UNITED STATES PATENT OFFICE.

LEWIS CHEESEMAN, SR., OF ALEXANDRIA, VIRGINIA, ASSIGNOR OF THREE-FOURTHS TO PARK AGNEW, A. H. AGNEW, AND M. B. HARLOW, OF ALEXANDRIA, VIRGINIA.

METHOD OF RECOVERING FREE AND COMBINED ACIDS OF NITER CAKE.

SPECIFICATION forming part of Letters Patent No. 714,145, dated November 25, 1902.

Application filed February 15, 1902. Serial No. 94,327. (No specimens.)

*To all whom it may concern:*

Be it known that I, LEWIS CHEESEMAN, Sr., a citizen of the United States, residing at Alexandria, in the county of Alexandria and State of Virginia, have invented certain new and useful Improvements in Processes of Recovering both the Free and Combined Acids of Niter Cake in Useful Forms; and I do hereby declare the following to be a full, clear, and exact description of the invention, such as will enable others skilled in the art to which it appertains to make and use the same.

My invention relates to the purification and use of niter cake in the production of precipitated sulfate of barium in the form known in the paint trade as "blanc fixe."

Precipitated sulfate of barium is in a very finely-divided state of subdivision, and is very useful as a paint material, but for this purpose it must be absolutely white. One of the plans followed in its production is to heat the impure native sulfate of barium with carbon and reduce it to the sulfid of barium, which is soluble in water. The soluble sulfid of barium is dissolved in water, forming the sulfhydrate, and separated from the insoluble residue. The solution of sulfhydrate of barium is then precipitated by a solution of some soluble sulfate, the precipitate filtered off, washed, and dried to form the blanc fixe of commerce.

Niter cake is produced as a by-product in large quantities in the manufacture of nitric and sulfuric acids. Very little use has been found for this by-product, and the producers of it are glad to get rid of it at very low prices or even give it away, notwithstanding the valuable materials it contains, so that it is practically a waste product. It consists of sulfuric acid chemically combined with soda, together with a certain excess of sulfuric acid, which may be considered as free or half combined with the sulfate of soda.

It has been proposed to use solutions of niter cake to precipitate sulfate of barium in the production of blanc fixe; but these solutions generally contain iron that will be precipitated as a black sulfid by the hydrogen sulfid developed on mixing the barium sulfhydrate with the acid sulfate-of-soda solution. This will darken the precipitated sulfate of barium, so that it will be useless for paint purposes. This very cheap material cannot therefore be directly employed in the production of blanc fixe from the sulfhydrate of barium; but I have discovered that if the iron it contains be removed it can be thus employed, and when purified produces a thoroughly white, clear, and bright blanc fixe. I accomplish this purification in a very simple and cheap manner.

In carrying out my process the niter cake is dissolved in water and a sufficient amount of oxid of calcium added to combine with the free or half-combined acid of the sulfate and to precipitate the iron. The amount of oxid of calcium to be added will of course vary with and depend upon the excess of sulfuric acid present. As long as the solution remains acid from the presence in it of free or half-combined acid an amount of sulfate of calcium corresponding to the amount of oxid added will be precipitated; but as soon as this free or half-combined acid is used up and the solution is made alkaline from the formation of hydrate of soda resulting from the interaction of the oxid of calcium and the normal sulfate of soda the solution becomes a solvent for sulfate of calcium and the precipitation ceases. As soon also as the solution becomes alkaline the iron it contains is precipitated, probably as a hydrated oxid. The precipitate is separated, and the purified solution of sulfate of soda is next used to precipitate sulfate of barium, preferably from a solution of sulfhydrate of barium, produced by heating sulfate of barium with carbon and leaching out the sulfid of barium thus formed. The sulfate of barium precipitated by the purified sulfate of soda is very white and gives an excellent quality of blanc fixe.

The sulfate of calcium precipitated in purifying the solution of sulfate of soda makes a good land-plaster and finds ready application in agriculture. It is particularly valuable as a fertilizer on account of its fine state of subdivision resulting from its being a chemical precipitate.

It will be seen then that by my process the ordinarily waste niter cake is successfully utilized in the production of blanc fixe and land-plaster.

In operating the niter cake is, for instance, dissolved in water in the proportion of about fifty-five cubic feet of water to a ton of the niter cake and the solution heated to near its boiling-point. Then about five hundred pounds of oxid of calcium in the form of ordinary quicklime suitably comminuted are added for each ton of niter cake used. This will precipitate about twelve hundred to thirteen hundred pounds of land-plaster, together with any iron the solution may contain. The precipitate is settled or filtered from the solution and suitably washed. This purified solution is then preferably added to a solution of sulfhydrate of barium produced by heating sulfate of barium with carbon and leaching. This solution should contain the sulfhydrate of barium in the proportion of one ton dissolved in about six hundred and forty cubic feet of water. This will precipitate the barium in the form of sulfate, which is filtered off, washed, and dried, becoming the blanc fixe of the paint trade.

The five hundred pounds of oxid of calcium used in precipitating the free or half-combined acid may be replaced by about nine hundred pounds of carbonate of calcium with equally effective results, the free or half-combined acid being precipitated as land-plaster, the iron being precipitated probably as a basic carbonate, and the solution becoming alkaline through the formation of carbonate of soda. For the purposes of this application oxid of calcium and carbonate of calcium are equivalents.

What I claim as new and valuable is—

The process of recovering both the free and combined acids of niter cake in useful forms, which consists in dissolving the niter cake in water, precipitating the free sulfuric acid as land-plaster by the addition of oxid of calcium, precipitating the iron by a further addition of oxid of calcium, filtering, precipitating the combined sulfuric acid as sulfate of barium by the addition of barium-sulfhydrate solution and recovering it as a pure white paint material, substantially as described.

In testimony whereof I affix my signature in the presence of two witnesses.

LEWIS CHEESEMAN, SR.

Witnesses:
JAMES E. JOHNSTON,
GEORGE D. JOHNSTON.